Jan. 21, 1969      J. L. SWICKARD, JR      3,423,566

FEED APPARATUS FOR EXTRUSION DIE

Filed Jan. 13, 1966                    Sheet 1 of 2

FIG-1

INVENTOR.
JAMES L. SWICKARD, Jr.
BY
Marechal, Biebel, French & Bugg
ATTORNEYS

United States Patent Office 3,423,566
Patented Jan. 21, 1969

3,423,566
FEED APPARATUS FOR EXTRUSION DIE
James L. Swickard, Jr., Hamilton, Ohio, assignor to The Black Clawson Company, Hamilton, Ohio, a corporation of Ohio
Filed Jan. 13, 1966, Ser. No. 520,333
U.S. Cl. 219—201      11 Claims
Int. Cl. H05b 3/54

ABSTRACT OF THE DISCLOSURE

A rotary joint for applying molten plastic material to a rotating or oscillating die incorporates a sintered carbon graphite bushing in axial compression and which forms a rotating seal. The bushing is formed with a central opening through which the plastic material flows and forms a continuation of a feed passageway and smoothly leads into the die interior. The rotating joint includes an electrically isolated feed tube of uniform dimension throughout its length for direct resistance heating and is insulated by an annular air space for preventing excessive heating on the rotating components of the joint.

---

This invention relates to the extrusion of plastic materials and more particularly to die feeding apparatus commonly known as rotating joints for applying plastic material to dies which rotate or oscillate about an axis.

Limitations which are inherent in die designs, particularly circular blown film designs currently available, result in some degree of gauge variation along the length of the die. The requirement for generally uniform sheet material from such blown film dies has resulted in die constructions which are adapted to rotate or to oscillate about an axis so that gauge variations are thus randomized across the width of the roll. However, such rotating or oscillating die constructions require that a rotating joint be provided by which the plastic material may be fed from a suitable source of such material, such as an extruder, into the die inlet manifold or distribution cavities.

This invention accordingly provides an improved rotating joint for delivering molten plastic material from an extruder or the like to the inlet of such a rotary or rotating die. The rotating joint of this invention is particularly adapted for use with dies of the type shown in the copending application of Barton et al. Ser. No. 474,616, filed July 26, 1965, now Patent No 3,314,109, and assigned to the same assignee as this invention. Also, the joint may be used with the rotating circular blown film die shown, for example, in the U.S. patent of Stephenson et al. No. 3,123,699 of Mar. 3, 1965.

It is accordingly a particular object of this invention to provide an improved rotating joint which is adapted for use with rotating or oscillating dies to provide for the delivery of plastic material from an extruder into the die distribution cavities.

A further object of this invention is to provide a rotating joint, as outlined above, including a sleeve of self-lubricating compressible bearing material which is received generally as an axial extension of a supply tube leading directly to an extruder, or the like, in which the sleeve provides a bearing surface for the relative movement of the die body and which is free of any abrupt dimensional changes or internal protuberances or recesses where plastic material could hang up and lead to degradation. This construction has particular advantage in handling polyvinyl chloride and similar materials which are heat sensitive.

Another important object of the invention is the provision, in a rotary joint, of electrical connecting structure by which low voltage electric current is applied substantially at the end of a plastic material supply tube for the direct resistance heating of such tube.

Another object of this invention is the provision of a rotary joint as outlined above, including provision for heating the plastic material while isolating the bearings and other movable structure from the effects of such heat, eliminating the need for high temperature bearings and lubricants.

A more particular object of this invention is the provision of a rotary joint in which a nonleaking seal between the die body and a relatively nonrotating component of the joint is provided which employs a compressible sleeve-like member of bearing material, such as molded carbon-graphite, and which is held in axial compression forming a nonleaking seal between the seal faces, and which provides an internal passageway for the delivery of molten plastic material into the die body.

These and other objects and advantages of the present invention will become apparent from the following description, the accompanying drawings, and the appended claims.

In the drawings—

FIG. 1 is a vertical section through a rotary joint made according to this invention;

Figure 2:
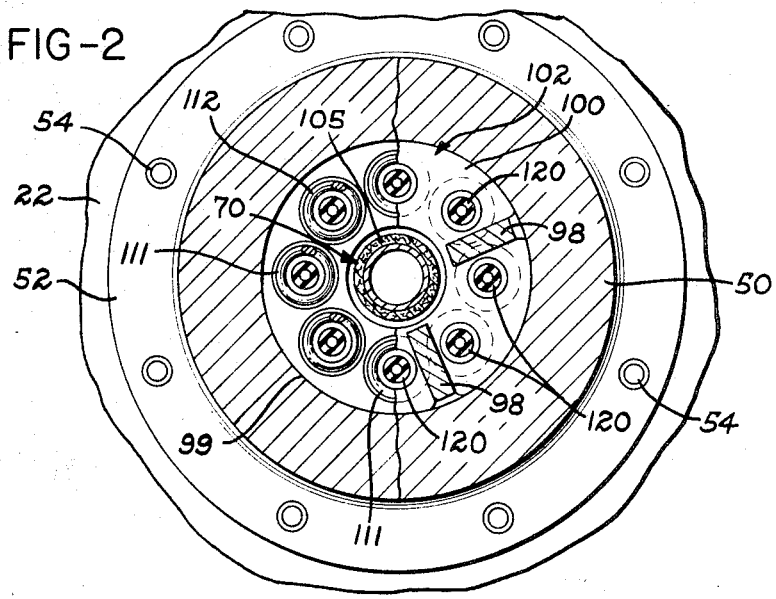
FIG. 2 is a transverse section through the joint of FIG. 1 taken generally along line 2—2 of FIG. 1.

Referring to the figures of the drawing which illustrate preferred embodiments of the invention, a rotating or oscillating die body is shown at 10 in FIG. 1 as including a centrally positioned plastic inlet feed passageway 11 and two of the radially diverging distribution passageways 12 and 13. The die 10 and the several distribution passageways may be constructed according to the above-referenced copending application of Barton et al., and operates to deliver plastic material in molten form to an annular die lip, not shown, for upward extrusion into a blown envelope. A further example of a rotary die with which this invention may be used is shown in the above-mentioned U.S. Patent 3,123,699 of Stephenson.

The die body 10 may be partially or wholly supported on the rotating joint illustrated generally at 20 in FIG. 1. The joint 20 is, in turn, supported on a die support table or platform 22, a portion of which is shown in FIG. 1. The table 22 may support the entire weight of the die, or it may support only the portion of the weight of the die transmitted through the joint 20. In the latter case, additional bearing means is commonly provided in larger dies at or near the periphery thereof for supporting the major portion of the weight of the die and providing for rotating and oscillating movement of the die about a vertical axis extending generally vertically through the inlet passageway 11.

The rotary joint of this invention may be considered as comprising two basic subassemblies including an inner joint body illustrated generally by the reference numeral 25 which is fixed relative to the support 22, and an outer joint body 26 which rotates with the die 10 on the inner body 25.

In further explanation, the outer body 26 may be formed with an outer, tubular, bearing-receiving sleeve 28 which supports a multiple-arm die mount 30. The mount 30 is formed, at its lower end, with an integral annular portion 31 received in surmounted relation on the bearing-receiving sleeve 28 by screws 34. The mount 30 further includes a plurality of upwardly and somewhat outwardly extending support arms 37 which terminate, at their upper end, at a further integral annular portion 38. The latter is received in supporting relation to the under side of the body 10 and is retained by machine screws 39.

In this manner, all or a portion of the weight of the body 10 may be carried through the mount 30 to the outer body sleeve 28. The mount 30 and the sleeve 26 of the outer body rotate with the die body 10 and such rotation may be effected, for instance, by means of an annular sprocket gear 40 mounted by screws 42 to the under surface of the sleeve 28 and connected by means of a sprocket chain 43 to a suitable drive motor, diagrammatically illustrated at 45.

The inner joint body 25 is fixed relative to the support 22 and includes a generally tubular-like support base 50, an upper portion of which is received substantially within the sleeve 28. The base 50 extends axially below the sleeve 28 and is formed with an outwardly directed annular flange 52 received and supported directly on the die support platform 22, and held in place by a series of machine screws 54.

The annular space between the base 50 and the sleeve 28 forms a means for receiving bearing means interposed between the inner and outer joint bodies providing for the rotation of the outer body 26 about the inner body 25. For this purpose, there are a pair of roller bearings 55 and 56 received within the space 58 formed between the inner surface of the sleeve 28 and the outer surface of the base 50, which surfaces define seats for the respective bearing races. Also, for this purpose, the base 50 is formed with an annular ledge 59 upon which the lower bearing 56 is seated forming a thrust-receiving abutment. Suitable grease seals are interposed between the members including a lower grease seal 60 and an upper grease seal 62, the latter being associated with a bearing retaining ring 65 threaded onto the outer surface of the upper end of the base 50.

A metal plastic supply tube 70 is connected at its lower end to receive plastic material from a suitable source of such material, such as an extruder or the like. The upper end of the tube 70 extends into the interior of the inner body 25 and terminates at 72 at a point which is relatively closely spaced from the inlet 11 of the die body 10, and in general alignment with this inlet. The end 72 of the tube 20 is received within a hollow support mandrel 75 and rests against a shouldered abutment 76 therein. Further, the tube end 72 may be suitably brazed, silver-soldered or welded to the mandrel 75.

As shown in FIG. 1, the mandrel 75 has an opening 78 therein which is in alignment with the tube and, in effect, forms an extension of the tube 70. The inner walls of the mandrel 75 form a passageway 78 which comprises a smooth transition from the inner surface of the tube 70 free of any stagnant pockets or abrupt dimensional changes, so that there is no place for plastic material to hang up and become stagnant as it flows from the end 72 of the tube 70 into the interior of the mandrel 75.

The joint further includes a generally sleeve-shaped seal or bearing 80 of low friction, self-lubricating and non-deteriorating compressible bearing material. The sleeve-shaped bearing 80 may be formed of molded sintered, carbon-graphite which has a low modulus of elasticity. A suitable such material is grade 39 Graphitar carbon-graphite of The United States Graphite Company, Division of The Wickes Corporation, Saginaw, Mich.

The bearing 80 is formed with an axial opening 82, therethrough which is positioned as an extension of the opening 78 of the mandrel 75 and leads directly into the inlet 11 of the die body 10. The bearing 80 is received within a suitable sleeve-like retainer 85, which is, in turn, received within a recess formed in the die body 10, and is retained in place by an annular seal retainer plate 88 and machine screws 89. The seal 80 forms a generally radially extending bearing surface 90 with the upper surface of the mandrel 75. As shown in FIG. 1, this upper surface is generally conical to provide for slight aligning movement of the joint with respect to the seal 80 without imposing uneven stresses or loads on the sleeve. Accordingly, a fluid tight seal is formed at the surface 90.

Means for maintaining the seal 80 in axial compression and urging the mandrel 75 into engagement with the sleeve includes a hollow mandrel support member 95 within which is mounted a split ring 96. The ring 96 is shouldered at 97 to receive the mandrel 75.

The mandrel support member 95 is formed, as shown in FIG. 2, with four annularly spaced, vertically extending support ribs 98. The ribs 98, two of which are shown in elevation in FIG. 1, are formed with outer sliding surfaces 99 at their upper ends which engage the adjacent inner surface of the tubular base 50 and which permit the member 95 to move axially therein. The lower ends of the legs 98 terminate at an annular support 100, the outer surface of which is similarly guided for vertical movement within the base 50. Accordingly, the mandrel support member 95 is formed with an upper section including the support ring 96, the four annularly spaced legs 98, and the lower annular support member 100, and defines with the base 50 an open air space 102. This open air space serves to isolate the base 50 and the bearings 55 and 56 from the heat of the plastic material within the tube 70. Also, the tube 70 is insulated with suitable wrapping material, such as the woven asbestos stripping 105.

The lower end of the base 50 is formed with an inwardly directed flange portion 110 generally opposite to the outwardly directed flange 52, and is provided with a series of eight vertically aligned openings 111 through which are received compression springs 112. The springs 112 are, accordingly, positioned in angularly spaced relation about the tube 70. A spring retainer plate 115 is provided with a central opening 116 through which the tube 70 extends, and is retained against the bottom of the base 50 by a plurality of screws 117 and maintains the springs 112 in compression against the member 100. Sufficient force is maintained by the springs to effect a fluid tight seal at the surface 90.

For the general purpose of direct resistance heating, reference may be had to Barton et al. 3,314,109 which shows a suitable electric heating circuit in which current in the order of 200 to 400 amperes at 3 to 6 volts is caused to flow through the delivery tube by suitable electric connections formed at the opposite ends of the tube, resulting in direct resistance heating of the tube 70 and the maintenance of a desired temperature of the plastic material conveyed within the tube. The rotating joint of this invention accordingly provides means by which the electric current may be conveyed through the joint and applied essentially at the end 72 of the tube 70 with minimum heating of the plastic components. For this purpose, electrical conduit means in the inner body 25 includes a plurality of insulating wires 120 which extend through openings 121 within the spring retainer plate 115 and through the springs 112 upwardly in the space 102 between the legs 98. The wires 120 terminate at electrical connections in the member 95, and are retained by the set screws 122. As many of the wires 120 may be used as is necessary to conduct the electric current to the mandrel support member 95 with a minimum of loss. The member 95, ring 96 and mandrel 75 form the means for conducting the electric current into the end of the tube 70. Spaced support and electric isolation for the tube may be provided by an insulating support 125, between the outer wall of the tube 70 and the inner surface of the flange 110.

In the operation of the embodiment shown in FIGS. 1 and 2, the motor 45 may be operated to cause the die body 10 to rotate or oscillate about the central axis. Relative movement occurs between the bearing 80 and the mandrel 75 at the radial sealing surface 90, and the material of the bearing 80 is held in axial compression and the seal at the surface 90 is maintained by the force of the springs 112. Electric heating current may be applied through the wires 120 to the end 72 of the tube 70 for the direct resistance heating of the tube and maintenance of the temperature of the contents.

Plastic material flows through the tube and into the mandrel 75, through the passageway 82 formed within the bearing 80 and into the die body inlet 11. It is understood that the body 11 may be heated generally or the individual passageways 12 and 13 may be resistance heated to maintain the temperature of the plastic material. The close coupling of the end 72 of the tube 70 with the inlet 11, together with the smooth interior passageways formed at 78 and 82 permits substantially direct feeding from the supply tube 70 into the inlet 11 in a joint which is free of abrupt or irregular portions on which plastic material would otherwise tend to accomulate or hang up. The open air space 102 effectively isolates the bearings from the heat of the plastic material so that ordinary commercial bearings and commercially available lubricants may be used.

Figure 3:
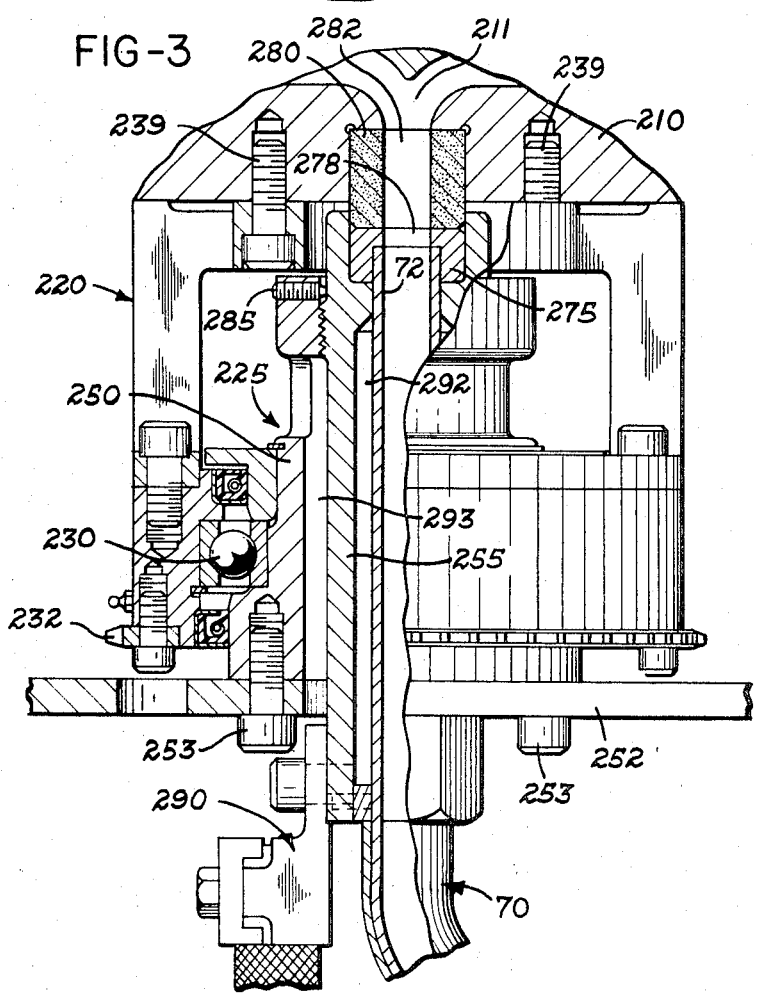
FIG. 3 is a view partially in vertical section and partially in elevation of a modified form of the joint.

Another form of the invention is shown in FIG. 3 in which the die body 210 is formed with a central inlet 211. In this embodiment, an outer joint body member 220 is supported by machine screws 239 on the die body and is rotatably mounted on an inner joint body 225 by a single ball bearing race 230. The outer body further supports a sprocket 232, corresponding in function to the sprocket 40 for rotating the die body 210.

The inner body 225 is similarly formed with a base 250, the lower end of which is mounted on a joint support member 252 by screws 253. The base 250 is hollow and is formed with internal threads which engage the threaded outer portion of a tubular mandrel support 255.

The embodiment of FIG. 3 further includes a hollow mandrel 275 on which is supported a sleeve-shaped sealing bearing 280. The bearing 280 may be formed of the same material as that which has been described in connection with the bearing 80 of FIG. 1, and is received within a suitable recess formed in the body 210, and forms an internal passageway 282 aligned with a corresponding opening 278 formed in the mandrel 275. The supply tube 70 has its upper end 72 received within the mandrel 275, so that, in effect, a continuous noninterrupted passageway is formed for the plastic material.

The bearing 280 is retained in axial compression by relative threaded adjustment between the base 250 and the mandrel support sleeve 255 at the threaded connection. Since the material of the seal 280 is characterized by a relatively low modulus of elasticity, the seal 280 will be axially compressed and retained in this condition. A set screw 285 maintains the adjusted position between the parts 250 and 255.

In this embodiment, the mandrel support 255 also serves as a low-resistance electrical path to provide an electrical connection with the end of the tube 70. The electrical fitting 290 at the lower end of the lower end of the support 255 forms an electrical connection while the support 255 provides a low impedance path to the upper end of the tube 70. Further, open air annular spaces 292 and 293 are formed on either side of the member 255 effectively isolating the bearing 230 from heating by the tube 70 and its contents.

It will therefore be seen that this invention provides rotating joints which apply plastic material into the inlet of a die body with a nonleaking seal construction. Bearings of relatively large diameter are used in surrounding relation to the inner body and which are effectively isolated from the effects of heating of the supply tube. The supply tube is, in turn, extended interiorly within the inner joint body and terminates at a region which is closely adjacent to the seal for substantially direct application of the plastic material into the die body inlet.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. A rotary joint for delivering molten plastic material from a supply of such material to the inlet of a rotary die comprising a die support, an inner joint body fixed relative to said support and an outer annular joint body fixed for rotation with said die, bearing means interposed between said inner and outer joint bodies providing for rotation of said outer body about said inner body, a plastic material supply tube adapted to receive such plastic materials from said supply and having one end thereof extending into the interior of said inner body, a sleeve of self-lubricating compressible bearing material positioned as an axial extension of said tube with an upper end thereof received in said die inlet and with the inner surface thereof forming a portion of a plastic material feed passageway substantially coextensive with said inner end of said tube and being free of abrupt dimensional changes for conducting such plastic material from said tube into said die inlet, and means at one end of said sleeve forming a bearing surface providing relative rotational movement between said die body and said inner joint member.

2. The joint of claim 1 in which there is means in said inner joint body defining an air space between said inner joint body and said tube in substantial surrounding relation to said tube isolating said joint bodies and said bearing means from the heat of plastic material in said tube.

3. The joint of claim 1 further comprising electrical conduit means in said inner body forming an electrical connection with said tube inner end for the direct resistance heating of said tube.

4. The joint of claim 1 in which said sleeve is formed of carbon-graphite.

5. The joint of claim 1 in which said inner body includes a mandrel with means in one end thereof receiving the inner end of said tube and having means defining a sliding surface with said sleeve, and being formed with an opening therein defining a transistional intermediate passage leading from the interior of said tube to the interior of said sleeve.

6. A rotary joint for delivering molten plastic material from a supply of such material to the inlet of a rotary die comprising a die support, an inner joint body fixed relative to said support and an outer joint body connected for rotation with said die about said inner body, bearing means interposed between said inner and outer joint bodies providing for rotation of said outer body about said inner body, means forming a plastic material supply tube adapted to receive such plastic material from said supply and having one end thereof extending into the interior of said inner body, means on said inner body forming a hollow mandrel at said tube inner end having an opening therethrough aligned with the open end of said tube and joining with said tube inner end to form a substantially continuous plastic material supply passage free of stagnant pockets and abrupt dimensional changes, a generally sleeve-shaped seal of low-friction nondeteriorating bearing material received on said mandrel and defining with said mandrel a generally radially extending bearing surface therewith and having an opening therethrough positioned as an axial extension of said supply passage, and means urging said seal into engagement with said mandrel and with said die inlet, with said seal being in axial compression therebetween, maintaining a fluid-tight sealing engagement at said bearing surface, with one end of said seal opening into said die inlet for the discharge of such plastic material therein.

7. The joint of claim 6 including means mounting said mandrel for axial movement in said inner body, and spring means urging said mandrel axially against said seal.

8. The rotary joint of claim 6 wherein said seal comprises a compressible sintered carbon-graphite sleeve and means in said inner body forming a threaded connection supporting said mandrel providing for relative axial adjustment of said mandrel to said inner body effecting a preload on said seal holding said seal in axial compression.

9. A rotary joint for delivering molten plastic material from a supply of such material to the inlet of a rotary die while providing for rotary movement of said die, comprising an inner joint body and on outer annular joint body, bearing means interposed between said inner and outer joint bodies providing for relative rotation of said bodies, means in said inner body forming a plastic material feed passageway adapted to receive such plastic materials from said supply, a sleeve of molded, sintered carbon-graphite material having an upper end thereof adapted to be received in said die inlet and with the inner surface thereof forming an extension of said plastic material feed passageway and being free of abrupt dimensional changes for conducting such plastic material from said passageway into said die inlet, means at one end of said sleeve forming a bearing surface providing relative rotational movement between said die body and said inner joint member, and means for loading said sleeve in axial compression for forming an effective seal at said bearing surface.

10. The rotary joint of claim 9 in which said means in said inner body forming said plastic material feed passageway comprises a metal tube, means supporting said tube in said inner body in spaced relation thereto substantially along its length, an annular mandrel member being mounted on the inner end of said tube and having a surface engaging said sleeve at said sleeve bearing surface and providing for the flow of plastic material from said tube into said sleeve.

11. The joint of claim 10 in which said mandrel forms an electrical connection to said tube inner end for the direct resistance heating of said tube.

References Cited
UNITED STATES PATENTS 3,020,588  2/1962  Ferguson et al. _____ 18—14 X
3,314,109  4/1967  Barton et al. _____ 18—14

RICHARD M. WOOD, *Primary Examiner.*

C. L. ALBRITTON, *Assistant Examiner.*

U.S. Cl. X.R.
18—14; 219—385